(12) United States Patent
Huang et al.

(10) Patent No.: US 8,980,140 B2
(45) Date of Patent: Mar. 17, 2015

(54) METHOD FOR MAKING ELECTRODE COMPOSITE MATERIAL

(75) Inventors: Xian-Kun Huang, Beijing (CN); Xiang-Ming He, Beijing (CN); Chang-Yin Jiang, Beijing (CN); Dan Wang, Beijing (CN); Jian Gao, Beijing (CN); Jian-Jun Li, Beijing (CN)

(73) Assignees: Tsinghua University, Beijing (CN); Hon Hai Precision Industry Co., Ltd., New Taipei (TW)

(*) Notice: Subject to any disclaimer, the term of this patent is extended or adjusted under 35 U.S.C. 154(b) by 295 days.

(21) Appl. No.: 13/097,406

(22) Filed: Apr. 29, 2011

(65) Prior Publication Data

US 2012/0168696 A1   Jul. 5, 2012

(30) Foreign Application Priority Data

Dec. 29, 2010   (CN) .......................... 2010 1 0619901

(51) Int. Cl.
*H01B 1/16*   (2006.01)
*H01M 4/1397*   (2010.01)
(Continued)

(52) U.S. Cl.
CPC .............. *H01M 4/1397* (2013.01); *H01M 4/58* (2013.01); *H01M 4/62* (2013.01); *H01M 10/0525* (2013.01); *Y02E 60/122* (2013.01)
USPC ..................... 252/521.5; 252/182.1

(58) Field of Classification Search
CPC ... Y02E 60/122; Y02E 60/12; H01M 10/052; H01M 10/0525; H01M 4/131; H01M 4/366; H01M 10/0569; H01M 4/136
USPC ............... 429/231.95, 231.1; 252/521.5, 182, 252/182.1
See application file for complete search history.

(56) References Cited

U.S. PATENT DOCUMENTS 6,827,921 B1 * 12/2004 Singhal et al. ................ 423/598
7,326,498 B2   2/2008 Park et al.
(Continued)

FOREIGN PATENT DOCUMENTS

| CN | 1416189 | 5/2003 |
| CN | 1622367 | 6/2005 |
| CN | 101241988 | 8/2008 |

(Continued)

OTHER PUBLICATIONS

J.Cho "Correlation between AlPO4 nanoparticle coating thickness on LiCoO2 cathode and thermal stablility", Electrochimica Acta, 48 (2003), 2807-2811.
(Continued)

*Primary Examiner* — Cynthia H Kelly
*Assistant Examiner* — Monique Wills
(74) *Attorney, Agent, or Firm* — Novak Druce Connolly Bove + Quigg LLP

(57) ABSTRACT

The present disclosure relates to a method for making an electrode composite material. In the method, a trivalent aluminum source, a doped element source, and electrode active material particles are provided. The trivalent aluminum source and the doped element source are dissolved in a solvent to form a solution having trivalent aluminum ions and doped ions. The electrode active material particles are mixed with the solution having the trivalent aluminum ions and doped ions to form a mixture. A phosphate radical containing solution is added to the mixture to react with the trivalent aluminum ions and doped ions, thereby forming a number of electrode composite material particles. The electrode composite material particles are heated.

20 Claims, 2 Drawing Sheets

(51) Int. Cl.
*H01M 4/58* (2010.01)
*H01M 4/62* (2006.01)
*H01M 10/0525* (2010.01)

(56) References Cited

U.S. PATENT DOCUMENTS

| | | | |
|---|---|---|---|
| 2003/0082448 | A1 | 5/2003 | Cho et al. |
| 2005/0118511 | A1 | 6/2005 | Park et al. |
| 2006/0199080 | A1* | 9/2006 | Amine et al. ............ 429/326 |
| 2011/0024298 | A1* | 2/2011 | Nishiguchi et al. ......... 205/50 |
| 2012/0164319 | A1* | 6/2012 | Lang et al. ............ 427/126.6 |

FOREIGN PATENT DOCUMENTS

| | | |
|---|---|---|
| CN | 101556226 | 10/2009 |
| CN | 101599544 | 12/2009 |
| CN | 101764207 | 6/2010 |
| CN | 101764209 | 6/2010 |
| EP | 1267431 | 12/2002 |
| TW | 200537720 | 11/2005 |

OTHER PUBLICATIONS

S.J.Sferco, et al, Electronic structure of semiconductor oxides: $InPO_4, In(PO_3), P_2O_5, SiO_2, AlPO_4$, and $Al(PO_3)_3$, Physical Review B, vol. 42, No. 17, p. 11232-11239.

* cited by examiner

METHOD FOR MAKING ELECTRODE COMPOSITE MATERIAL

CROSS-REFERENCE TO RELATED APPLICATIONS

This application claims all benefits accruing under 35 U.S.C. §119 from China Patent Application No. 201010619901.0, filed on Dec. 29, 2010, in the China Intellectual Property Office, the contents of which are hereby incorporated by reference. This application is related to commonly-assigned applications entitled, "ELECTRODE COMPOSITE MATERIAL AND LITHIUM ION BATTERY USING THE SAME", filed Apr. 29, 2011 Ser. No. 13/097,397; "ELECTRODE COMPOSITE MATERIAL, METHOD FOR MAKING THE SAME, AND LITHIUM ION BATTERY USING THE SAME", Ser. No. 13/092,135, filed Apr. 21, 2011; "LITHIUM TITANATE COMPOSITE MATERIAL, METHOD FOR MAKING THE SAME, AND LITHIUM ION BATTERY USING THE SAME", filed May 3, 2011 Ser. No. 13/099,383; "LITHIUM TITANATE COMPOSITE MATERIAL, METHOD FOR MAKING THE SAME, AND LITHIUM ION BATTERY USING THE SAME", filed May 3, 2011 Ser. No. 13/099,382.

BACKGROUND

1. Technical Field

The present disclosure relates to a method for making an electrode composite material.

2. Description of Related Art

A typical lithium ion battery includes a cathode, an anode, a separator, and an electrolyte. The performance of electrode active material of the cathode and anode is a key factor, which influences the performance of the lithium ion battery. Typical cathode active materials are lithium cobalt oxide ($LiCoO_2$), lithium nickel oxide ($LiNiO_2$), lithium manganese oxide ($LiMn_2O_4$), and lithium iron phosphate (LiFePO4). Typical anode active materials are lithium titanate ($Li_4Ti_5O_{12}$) and carbonaceous materials such as graphite and carbon nanotubes. A conventional method for improving the performance of the electrode active material can be executed by coating other material on a surface of the electrode active material particles. Presently, $LiCoO_2$ or other electrode active material particles coated by aluminum phosphate ($AlPO_4$) has been studied to improve the thermal stability of the lithium ion battery. However, conductivity of the electrode active material coated by $AlPO_4$ may decrease due to the poor conductivity of the $AlPO_4$.

What is needed, therefore, is to provide a method for making an electrode composite material having a good thermal stability and conductivity.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
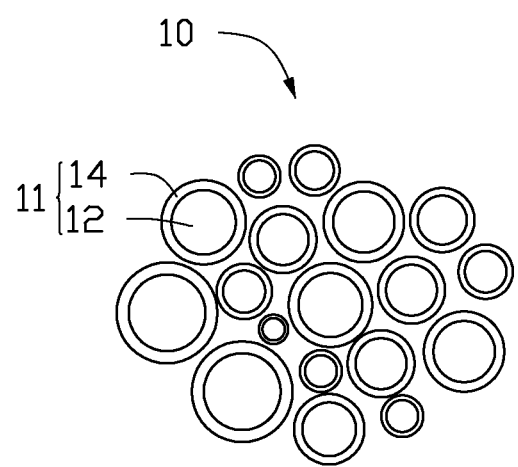
FIG. 1 is a structural schematic view of an embodiment of an electrode composite material of a lithium ion battery.
Figure 2:
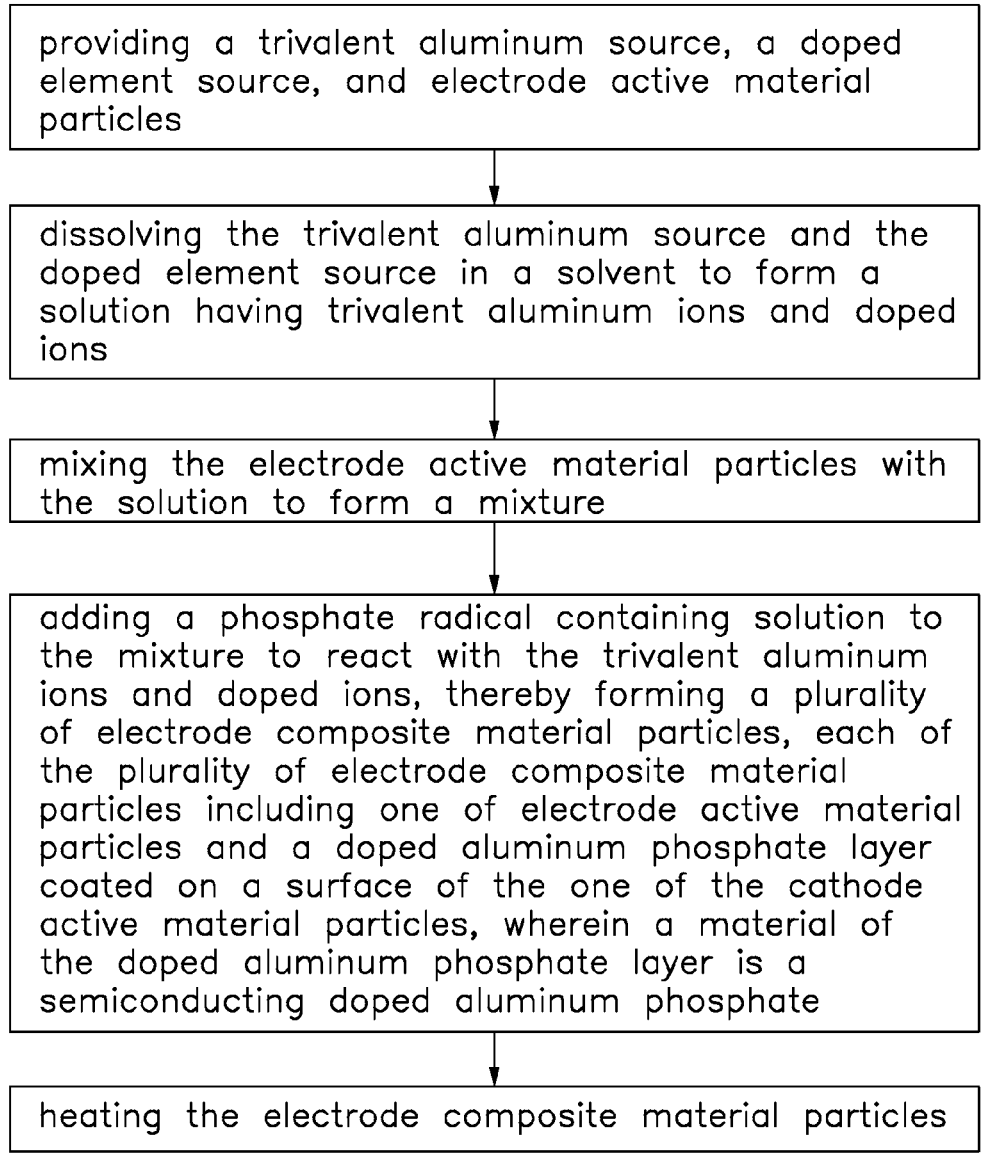
FIG. 2 is a flow chart of an embodiment of a method for making the electrode composite material of FIG. 1.

Referring to FIGS. 1 and 2, one embodiment of an electrode composite material 10 of a lithium ion battery includes a plurality of electrode composite material particles 11. Each of the electrode composite material particles 11 includes an electrode active material particle 12 and a doped aluminum phosphate layer 14. The doped aluminum phosphate layer 14 can be individually coated on the single electrode active material particle 12. In one embodiment, each of the electrode active material particles 12 has the doped aluminum phosphate layer 14 coated on the surface thereof. A material of the doped aluminum phosphate layer 14 is a semiconducting doped aluminum phosphate. In the doped aluminum phosphate layer 14, a concentration of free electrons can be larger than that of cavities, or a concentration of cavities can be larger than that of free electrons, consequently, the doped aluminum phosphate layer 14 has semiconducting properties.

The material of the doped aluminum phosphate layer 14 can be represented by a chemical formula of $Al_{1-n}M_nPO_4$, wherein M represents doped element, and $0<n<1$. The doped element can be selected from the elements which can be doped in the crystal lattice of $AlPO_4$. Specifically, the atom radius of the doped element can be close to and cannot be much larger than that of aluminum (Al) atom, and a valence of the doped element can be divalency (+2) or quadrivalence (+4). In addition, a molar ratio of the doped element to the doped aluminum phosphate layer 14 can be in a range from about 1% to about 20%, namely, $0.01 \leq n \leq 0.2$. The doped element can be a metal element having the valence of +2, such as beryllium (Be), cadmium (Cd), nickel (Ni), iron (Fe), copper (Cu), magnesium (Mg), or any combination thereof. In addition, the doped element can be a metal element having the valence of +4, such as vanadium (V), niobium (Nb), tantalum (Ta), titanium (Ti), zirconium (Zr), or any combination thereof. In one embodiment, the cavity concentration is larger than the free electron concentration in the doped aluminum phosphate layer 14, due to the doped element having the valence of +2. The doped aluminum phosphate layer 14 is a P type semiconductor having a cavity conductive mechanism. In another embodiment, the electron concentration is larger than the cavity concentration in the doped aluminum phosphate layer 14, due to the doped element having the valence of +4, consequently, the doped aluminum phosphate layer 14 is an N type semiconductor having an electron conductive mechanism. Thus, the doped aluminum phosphate layer 14 has semiconducting properties.

The doped aluminum phosphate layer 14 has a uniform thickness, and exists in a form of continuous layer shape. A mass ratio of the doped aluminum phosphate layer 14 to the electrode composite material 10 can be in a range from about 0.1% to about 3%. A thickness of the doped aluminum phosphate layer 14 can be in a range from about 5 nanometers (nm) to about 20 nm. The doped aluminum phosphate layer 14 is in situ formed on the surfaces of the electrode active material particles 12. Furthermore, an interfacial diffusion may emerge between the doped aluminum phosphate layer 14 and the electrode active material particle 12.

The electrode active material particles 12 can be cathode active material particles or anode active material particles. If the electrode active material particles 12 are cathode active material particles, the electrode composite material 10 is a cathode composite material. If the electrode active material particles 12 are anode active material particles, the electrode composite material 10 is an anode composite material. The cathode active material particles can be doped or undoped spinel lithium manganese oxide, layer-shaped lithium manganese oxide, lithium nickel oxide, lithium cobalt oxide, lithium iron phosphate, lithium nickel manganese oxide, lithium nickel cobalt oxide, or any combination thereof. In the embodiment, the formula of the spinel lithium manganese oxide can be $Li_xMn_{2-y}L_yO_4$. The formula of the lithium nickel oxide can be $Li_xNi_{1-y}L_yO_2$. The formula of the lithium cobalt oxide can be $Li_xCo_{1-y}L_yO_2$. The formula of the layered lithium manganese oxide can be $Li_xMn_{1-y}L_yO_2$. The formula of the lithium iron phosphate can be $Li_xFe_{1-y}L_yPO_4$. The formula of the lithium nickel manganese oxide can be $Li_xNi_{0.5+z-a}Mn_{1.5-z-b}L_aR_bO_4$. The formula of the lithium nickel cobalt oxide can be $Li_xNi_cCo_dMn_eL_fO_2$. In the above formulas, $0.1 \leq x \leq 1.1$, $0 \leq y < 1$, $0 \leq z < 1.5$, $0 \leq a-z < 0.5$, $0 \leq b+z < 1.5$, $0 < c < 1$, $0 < d < 1$, $0 < e < 1$, $0 \leq f \leq 0.2$, and $c+d+e+f=1$. L and R represent at least one of the chemical elements of alkali metal elements, alkaline-earth metal elements, Group-13 elements, Group-14 elements, transition metal elements, and rare-earth elements. In one embodiment, L and R represent at least one of the chemical elements of manganese (Mn), nickel (Ni), chromium (Cr), cobalt (Co), vanadium (V), titanium (Ti), aluminum (Al), iron (Fe), gallium (Ga), neodymium (Nd), and magnesium (Mg). The anode active material particles can be lithium titanate, graphite, acetylene black, organic cracking carbon, mesocarbon microbeads (MCMB), or any combination thereof. More specifically, the lithium titanate can be doped or undoped spinel lithium titanate, the formula of the undoped lithium titanate can be $Li_4Ti_5O_{12}$, the formula of the doped lithium titanate can be $Li_{(4-g)}A_gTi_5O_{12}$ or $Li_4A_hTi_{(5-h)}O_{12}$, wherein $0 < g \leq 0.33$ and $0 < h \leq 0.5$. In the formula, A represents at least one of the chemical elements of alkali metal elements, alkaline-earth metal elements, Group-13 elements, Group-14 elements, transition metal elements, and rare-earth elements. In one embodiment, A represents at least one of the chemical elements of Mn, Ni, Cr, Co, V, Ti, Al, Fe, Ga, Nd, and Mg.

The doped aluminum phosphate layer 14 can obstruct the electron migration between the electrolyte solution and the electrode active material particles 12 of lithium ion battery. Meanwhile, the doped aluminum phosphate layer 14 can provide passages of the lithium ions. Therefore, a secondary reaction between the electrode and the electrolyte solution can be prevented. Meanwhile, the thermal stability of the lithium ion battery can be improved. In addition, the doped aluminum phosphate layer 14 has a better conductivity than the aluminum phosphate due to the doped element. Thus, the conductivity of electrode active material particles 12 coated by the doped aluminum phosphate layer 14 has a good conductivity.

Referring to FIG. 2, one embodiment of a method for making the electrode composite material includes the following steps:

S1: providing a trivalent aluminum source, a doped element source, and electrode active material particles;

S2: dissolving the trivalent aluminum source and the doped element source in a solvent to form a solution having trivalent aluminum ions and doped ions;

S3: mixing the electrode active material particles with the solution to form a mixture;

S4: adding a phosphate radical containing solution to the mixture to react with the trivalent aluminum ions and doped ions, thereby forming a plurality of electrode composite material particles, each of the plurality of electrode composite material particles including one of electrode active material particles and a doped aluminum phosphate layer coated on a surface of the one of the cathode active material particles, wherein a material of the doped aluminum phosphate layer is a semiconducting doped aluminum phosphate and S5: heating the electrode composite material particles.

In the step S1, the trivalent aluminum source and the doped element source can be soluble in the solvent of step S2, and can react with the phosphate radical containing source to form doped aluminum phosphate. Other reaction products except the doped aluminum phosphate can be removed by a heating step. The trivalent aluminum source can be aluminum nitrate ($Al(NO_3)_3$) or aluminum nitrite ($Al(NO_2)_3$). The doped element in the doped element source has the valence of +2 or +4. The doped element source having the valence of +2 can be nickel nitrate ($Ni(NO_3)_2$), magnesium nitrate ($Mg(NO_3)_2$), copper nitrate ($Cu(NO_3)_2$), ferrous nitrate ($Fe(NO_3)_2$), or any combination thereof. The doped element source having the valence of +4 can be vanadium nitrate ($V(NO_3)_4$), niobium nitrate ($Nb(NO_3)_4$), or zirconium nitrate ($Zr(NO_3)_4$, or any combination thereof.

In step S2, the solvent can dissociate the trivalent aluminum source to form aluminum ions. Meanwhile, the solvent can dissociate the doped element source to form ions of the doped element. The solvent can be water or volatile organic liquid phase solvent. In one embodiment, the solvent is volatile organic liquid phase solvent such as ethanol, acetone, chloroform, diethyl ether, dichloromethane, or combination thereof. Water absorbed on the electrode active material particles may deteriorate the performance of the electrode active material particles. Compared with water, using the volatile organic liquid phase solvent as the solvent can prevent deteriorating the performance of the electrode active material particles. In one embodiment, the volatile organic liquid phase solvent is absolute ethanol.

In step S3, the electrode active material particles are insoluble in the solution having the trivalent aluminum ions and the doped ions. Thus, the electrode active material particles and the solution having the trivalent aluminum ions and the doped element ions are mixed in a form of a slurry, and the trivalent aluminum ions and the doped ions can be uniformly coated on the surfaces of the electrode active material particles in atomic scale. The mass ratio of the solution to the electrode active material particles can be further adjusted to form a pasty mixture. In the pasty mixture, amount of the solution is only enough to cover the surfaces of the electrode active material particles. A relationship between the amounts of the solution and the electrode active material particles can be represented by an equation of $1:10 \leq Vs:Ve \leq 1:40$, wherein Vs represents a volume of the solution, Ve represents a volume of the electrode active material particles. In one embodiment, $1:10 \leq Vs:Ve \leq 1:20$. A diameter of the electrode active material particles can be less than 20 micrometers. The amount of the solution can be determined by the desired mass ratio of the doped aluminum phosphate layer to the electrode composite material. In one embodiment, the mass ratio of the doped aluminum phosphate layer to the electrode composite material is in a range from about 0.1% to about 3%.

Furthermore, the solution can be agitated to form a uniform pasty mixture, by which the trivalent aluminum ions and the doped ions can be uniformly coated on the surface of the electrode active material particles. The means of agitating is not limited and can be magnetic stirring, ultrasonic agitating, or mechanical stirring. In addition, if the solvent is volatile, an additional solvent can be continuously added in the mixture to compensate the volatilized solvent during the agitating process, thereby continuously keeping the mixture a desired consistency.

In step S4, the solution of the phosphate radical containing solution includes a solvent and a soluble phosphate radical containing source dissolved in the solvent. The solvent can be water. The phosphate radical containing source can react with the trivalent aluminum source and the doped element source to form doped aluminum phosphate, and the other reacting product can be removed by the heating step in step S5. The phosphate radical can be orthophosphoric radical ($PO_4^{3-}$), dihydrogen phosphate radical ($H_2PO_4^-$), hydrophosphate radical ($HPO_4^{2-}$), or any combination thereof. The phosphate radical containing source can be phosphoric acid ($H_3PO_4$) or ammonium phosphate salts. The ammonium phosphate salts can be at least one of triammonium phosphate (($NH_4$)$_3PO_4$), ammonium dihydrogen phosphate ($NH_4H_2PO_4$), and diammonium hydrogen phosphate (($NH_4$)$_2HPO_4$). An amount of the water in the phosphate radical containing solution can just be as few as possible with the phosphate radical containing source totally dissolved therein.

When the phosphate radical containing solution is added to the pasty mixture, the phosphate radical ions react with $Al^{3+}$ and the doped ions are adhered on the surface of the electron active material particles, thereby in-situ forming doped aluminum phosphate layer uniformly coated on the surface of the electrode active material particles. In addition, the phosphate radical containing solution can be slowly added in the pasty mixture. Meanwhile, the pasty mixture is continuously stirred to make the phosphate radical ions thoroughly react with the $Al^{3+}$ and doped element ions. Besides, the amount of the phosphate radical containing source can be determined by the desired mass ratio of the doped aluminum phosphate layer to the electrode active material particles.

In step S5, the doped aluminum phosphate layer and the electrode active material particles can be firmly combined at the contact interfaces therebetween, thereby forming the electrode composite material. Meanwhile, the residual solvent and the other reacting production (e.g. ammonium nitrate ($NH_4NO_3$)) in step S4 can be removed. In addition, an interface diffusion between the doped aluminum phosphate layer and the electrode active material particles may be generated by heating. The heating temperature can be in a range from about 400 degrees Celsius (° C.) to about 800° C. A heating period can be in a range from about 0.5 hours to about 2 hours.

When the electrode active material particles are added into the solution having the $Al^{3+}$ and the doped ions, the phosphate radical containing solution can react with the $Al^{3+}$ and the doped ions to in situ form the continuous doped aluminum phosphate layer coated on the surface of the electrode active material particles. In addition, the $Al^{3+}$ and the doped ions can uniformly coat the electrode active material particles because the solution and the electrode active material particles are mixed in a form of mixture including both solid and liquid. Thus, the doped aluminum phosphate layer, formed in situ by the reaction among the $Al^{3+}$, the doped ions, and the phosphate radical, can uniformly coat on the surface of the electrode active material particles. In the prior art, the aluminum phosphate particles are firstly formed, and then absorbed on the surfaces of the electrode active material particles. However, the non-uniformity of absorption results in a non-uniform aluminum phosphate layer. Comparing with the prior art, the uniformity of the coating of the aluminum phosphate layer can be efficiently improved, because the electrode active material particles and the aluminum phosphate are not mixed in a form of powder. Furthermore, the doped aluminum phosphate layer having a uniform thickness can obstruct the electron migration between the electrolyte and the electrode active material particles. Meanwhile, the doped aluminum phosphate layer can provide passages for lithium ions. Thus, the decomposition of the electrolyte along with the insertion or extraction of the lithium ions under a high or low voltage can be avoided. The electrode active material particles have a good electrochemical performance and capacity retaining performance. In addition, compared with the aluminum phosphate coating electrode composite material, the electrode composite material having the doped aluminum phosphate layer has a better conductivity, because the doped aluminum phosphate is a semiconductor having electron conductive mechanism or cavity conductive mechanism.

One embodiment of a lithium ion battery includes a cathode, an anode, and a non-aqueous electrolyte disposed between the cathode and the anode. The cathode includes a cathode current collector and a cathode material layer disposed on a surface of the cathode current collector. The anode includes an anode current collector and an anode material layer disposed on a surface of the anode.

In one embodiment, the cathode material layer includes a cathode composite material, a conductive agent and a binder. The cathode composite material includes a plurality of cathode composite material particles. Each of the cathode composite material particles includes a cathode active material particle and a doped aluminum phosphate layer. The doped aluminum phosphate layer can be individually coated on the single cathode active material particle. A material of the doped aluminum phosphate layer is a semiconducting doped aluminum phosphate. Specifically, the electrode composite material 10 is the cathode composite material. The cathode composite material includes lithium cobalt oxide composite material. The electrode active material particles 12 are undoped lithium cobalt oxide particles ($LiCoO_2$). The material of the doped aluminum phosphate layer 14 can be $Al_{0.95}Ni_{0.05}PO_4$. A thickness of the doped aluminum phosphate layer 14 is about 10 nm. A mass percentage of the doped aluminum phosphate layer 14 in the electrode composite material 10 is about 1%.

In an embodiment of a method for fabricating the lithium cobalt oxide composite material particles, the aluminum nitrate and the nickel nitrate are dissolved in the ethanol to form the solution having $Al^{3+}$ and nickel ions. A molar ratio of $Al^{3+}$ to nickel ions is about 0.95:0.05. A volume of the solution having $Al^{3+}$ and nickel ions is about 30 milliliters (mL). A molar concentration of the solution having $Al^{3+}$ and nickel ions is about 0.16 molar per liter (mol/L). The lithium cobalt oxide particles with an amount of about 100 gram (g) are added into the solution having $Al^{3+}$ and nickel ion. The phosphate radical containing solution is ($NH_4$)$_2HPO_4$ water solution. The heating temperature is about 400° C.

In one embodiment, the anode material layer includes an anode composite material, a conductive agent and a binder. The anode composite material includes a plurality of anode composite material particles. Each of the anode composite material particles includes an anode active material particle and a doped aluminum phosphate layer. The doped aluminum phosphate layer can be individually coated on the single anode active material particle. A material of the doped aluminum phosphate layer is a semiconducting doped aluminum phosphate. Specifically, the electrode composite material 10 is the anode composite material. The anode composite material includes lithium titanate composite material. The electrode active material particles 12 are undoped lithium titanate particles ($Li_4Ti_5O_{12}$). The material of the doped aluminum phosphate layer 14 can be $Al_{0.95}Ni_{0.05}PO_4$. A thickness of the doped aluminum phosphate layer 14 is about 10 nm. A mass percentage of the doped aluminum phosphate layer 14 in the electrode composite material 10 is about 1%.

In an embodiment of a method for fabricating the lithium titanate composite material particles, the aluminum nitrate and the nickel nitrate are dissolved in the ethanol to form the solution having $Al^{3+}$ and nickel ions. A molar ratio of $Al^{3+}$ to nickel ions is about 0.95:0.05. A volume of the solution having $Al^{3+}$ and nickel ions is about 30 milliliters (mL). A molar concentration of the solution having $Al^{3+}$ and nickel ions is about 0.16 molar per liter (mol/L). The lithium titanate particles with an amount of about 100 gram (g) are added into the solution having $Al^{3+}$ and nickel ion. The phosphate radical containing solution is $(NH_4)_2HPO_4$ water solution. The heating temperature is about 400° C.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method for making electrode composite material, the method comprising:
   providing a trivalent aluminum source, a doped element source, and electrode active material particles;
   dissolving the trivalent aluminum source and the doped element source in a solvent to form a solution having trivalent aluminum ions and doped ions;
   coating the trivalent aluminum ions and the doped ions on surfaces of the electrode active material particles by mixing the electrode active material particles with the solution having the trivalent aluminum ions and the doped ions to form a mixture;
   adding a phosphate radical containing solution to the mixture to react with the trivalent aluminum ions and the doped ions, thereby forming a plurality of electrode composite material particles; and
   heating the plurality of electrode composite material particles.

2. The method of claim 1, wherein the electrode active material particles are insoluble in the solution having the trivalent aluminum ions and the doped ions.

3. The method of claim 2, further comprising adjusting a mass ratio of the solution with the trivalent aluminum ions and the doped ions to the electrode active material particles to form a pasty mixture.

4. The method of claim 1, wherein a volume ratio of the solution having the trivalent aluminum ions and the doped ions to the electrode active material particles is in a range from about 1:10 to about 1:40.

5. The method of claim 1, wherein a diameter of the electrode active material particles is less than 20 micrometers.

6. The method of claim 1, wherein the electrode active material particles are cathode active material particles, and the cathode active material particles comprise of a material that is selected from the group consisting of spinel lithium manganese oxide, layered lithium manganese oxide, lithium nickel oxide, lithium cobalt oxide, lithium iron phosphate, lithium nickel manganese oxide, and lithium nickel cobalt oxide.

7. The method of claim 1, wherein the electrode active material particles are anode active material particles, and the anode active material particles comprise of a material that is doped or undoped spinel lithium titanate, a formula of the undoped spinel lithium titanate is $Li_4Ti_5O_{12}$, a formula of the doped spinel lithium titanate is $Li_{(4-g)}A_gTi_5O_{12}$ or $Li_4A_hTi_{(5-h)}O_{12}$, $0<g\leq0.33$, $0<h\leq0.5$, A represents at least one of the chemical elements of alkali metal elements, alkaline-earth metal elements, Group-13 elements, Group-14 elements, transition metal elements, and rare-earth elements.

8. The method of claim 1, wherein the solvent is volatile organic liquid phase solvent.

9. The method of claim 8, wherein the volatile organic liquid phase solvent comprises of a material that is selected from the group consisting of ethanol, acetone, chloroform, diethyl ether, and dichloromethane.

10. The method of claim 1, further comprising agitating the mixture, and adding additional solvent in the mixture to compensate the solvent that has volatilized during agitating the mixture, thereby continuously keeping the mixture at about the same consistency.

11. The method of claim 1, wherein the trivalent aluminum source is aluminium nitrate or aluminium nitrite.

12. The method of claim 1, wherein the doped element source is bivalent, the doped element source comprises of a material that is selected from the group consisting of nickel nitrate, magnesium nitrate, copper nitrate, and ferrous nitrate.

13. The method of claim 1, wherein the doped element source is quadrivalent, the doped element source comprises of a material that is selected from the group consisting of vanadium nitrate, niobium nitrate, and zirconium nitrate.

14. The method of claim 1, wherein the phosphate radical containing solution comprises water and a soluble phosphate radical containing source dissolved in the water.

15. The method of claim 14, wherein the phosphate radical containing source is phosphoric acid or ammonium phosphate salts.

16. The method of claim 1, wherein the heating the electrode composite material particles further comprises heating to about 400° C. to about 800° C.

17. The method of claim 1, wherein each of the plurality of electrode composite material particles comprises one of the electrode active material particles and a doped aluminum phosphate layer coated on a surface of the one of the electrode active material particles, wherein a material of the doped aluminum phosphate layer is a semiconducting doped aluminum phosphate.

18. A method for making electrode composite material, the method comprising:
   dissolving a trivalent aluminum source and a doped element source in a solvent to form a solution of trivalent aluminum ions and doped ions;
   coating the trivalent aluminum ions and the doped ions on surfaces of electrode active material particles by mixing the electrode active material particles with the solution of trivalent aluminum ions and doped ions to form a mixture; and
   adding a phosphate radical containing solution to the mixture to react with the trivalent aluminum ions and the doped ions on the surfaces of electrode active material particles.

19. The method of claim 18, wherein a volume ratio of the solution of trivalent aluminum ions and doped ions to the electrode active material particles is in a range from about 1:10 to about 1:40.

20. The method of claim 18, wherein a volume ratio of the solution of trivalent aluminum ions and doped ions to the electrode active material particles is in a range from about 1:10 to about 1:20.

* * * * *